United States Patent [19]

Akright

[11] Patent Number: 4,907,921
[45] Date of Patent: Mar. 13, 1990

[54] TIE-DOWN ASSEMBLY

[75] Inventor: Michael V. Akright, Lake Villa, Ill.

[73] Assignee: A. L. Hansen Manufacturing Co., Gurnee, Ill.

[21] Appl. No.: 609,487

[22] Filed: May 11, 1984

Related U.S. Application Data

[63] Continuation-in-part of Ser. No. 567,627, Jan. 3, 1984, abandoned.

[51] Int. Cl.$^4$ ............................................. B61D 45/00
[52] U.S. Cl. ..................................................... 410/111
[58] Field of Search ............... 410/101, 111, 112, 116, 410/106–109, 113, 196; 16/122, 123, 125, 126, 127; 248/499, 508; 312/330; 190/115, 116; 403/209

[56] References Cited

U.S. PATENT DOCUMENTS 2,771,154 11/1956 Gonzales .................................. 16/126
4,060,030 11/1977 Palms .............................. 410/109 X
4,134,480 1/1979 Davis ................................ 16/125 X

OTHER PUBLICATIONS

Eberhard Manufacturing Company Brochure on No. 170 Ring Pull, 1980.
Polar Hardware Manufacturing Company, Inc. brochure on Recessed Rope Ring No. 601.
Two page brochure of Ancra Corporation.
Two page Brochure of Hansen Manufacturing Company.

Primary Examiner—Margaret A. Focarino
Assistant Examiner—Frank H. Williams, Jr.
Attorney, Agent, or Firm—Willian Brinks Olds Hofer Gilson & Lione

[57] ABSTRACT

A tie-down assembly is disclosed which includes a plastic guard rail that defines a central floor and spaced, parallel interior walls which cooperate to define a recess, a pair of beveled exterior surfaces disposed outside of the respective interior walls, and an array of slits in the floor. A clamp formed of a folded piece of sheet metal defines a sleeve section disposed in the recess and a shank section which passes through one of the slits in the floor. A tie-down ring is pivotably mounted in the sleeve section and is movable between a stowed position, in which no part of the clamp or tie-down member extends out of the recess, and a use position. Aligned openings are defined by the floor and the shank section of the clamp, and a single fastener can be positioned to pass through the aligned openings in order to secure the entire tie-down assembly in place.

30 Claims, 2 Drawing Sheets

TIE-DOWN ASSEMBLY

IDENTIFICATION OF RELATED APPLICATION

This application is a continuation in part of co-pending application Ser. No. 06/567,627, filed Jan. 3, 1984 now abandoned.

BACKGROUND OF THE INVENTION

The present invention relates to an improved tie-down assembly of the type used to secure tie-down ropes or straps in place, as for example inside a truck or cargo container.

Tie-down assemblies have been in widespread use for some time. Such an assembly is typically mounted to an inside panel of a truck or container, and tie-down lines, straps or ropes are then secured to the tie-down assembly and used to hold freight in position.

In some applications it is not desirable or feasible to recess the tie-down assembly inside the panel. This is the case for example where the assembly is to be mounted to a fiberglass reinforced panel. In these cases, it is particularly important that the tie-down assembly provide a smooth contour which will not snag or damage freight that comes into contact with the tie-down assembly. Another important characteristic of a tie-down assembly is the maximum load it will bear reliably.

Certain tie-down assemblies of the prior art utilize four-piece constructions in which a tie-down ring is held in place in a clamp which is spot-welded to a metallic plate. This metallic plate is in turn mounted inside a beveled plastic ring. Two examples of this prior art approach are the tie-down assembly Model No. 39F (manufactured by the assignee of the present invention) and the tie-down assembly Model No. P/N44701-10 (manufactured by Ancra Corporation of El Segundo, Calif.).

These four-part tie-down assemblies of the prior art exhibit a significant drawback in that the clamp which holds the tie-down ring in place extends above the perimeter of the metal plate to which it is attached. This protruding clamp can snag and damage freight which comes into contact with the tie-down assembly. Another recurring problem of these prior art assemblies relates to the manner in which the clamp is affixed to the plate. The entire clamp is disposed on the exterior surface of the plate and is held to the plate by means of spot-welds. In practice, it has been found that these spot-welds limit the strength of the tie-down assembly.

SUMMARY OF THE INVENTION

The present invention is directed to an improved tie-down assembly which utilizes a novel tie-down clamp arrangement that lowers the profile of the clamp while simultaneously increasing the strength of the tie-down assembly.

According to this invention, a tie-down assembly is provided which comprises a guard member which comprises a recess defined by a central floor and an interior wall, and a beveled exterior surface located outwardly from the interior wall. A clamp is provided which defines a sleeve section disposed in the recess and a shank section which passes through an opening in the floor. A tie-down member, such as a tie-down ring, is pivotably mounted in the sleeve section and is movable between a stowed position, in which no part of the clamp or tie-down member extends out of the recess, and a use position. The tie-down assembly of this invention is mounted in place by a fastener which passes through aligned openings in the floor of the guard member and the shank section of the clamp. In one preferred embodiment described below, the guard member is shaped as an elongated rail on which several clamps and tie-down members can be mounted.

The tie-down assembly of this invention provides important advantages. Because no part of the assembly extends above the beveled exterior surface when the tie-down member is in the stowed position, the assembly of this invention provides a particularly low profile and minimizes the tendency of freight to be snagged or damaged by the assembly. Furthermore, since a single fastener secures both the shank of the clamp and the cup to the mounting surface, the assembly of this invention provides particularly high pull-out resistance. The entire assembly can be fabricated out of only three pieces, and it can readily be mounted onto a panel without any need to recess the assembly into the panel.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 3:
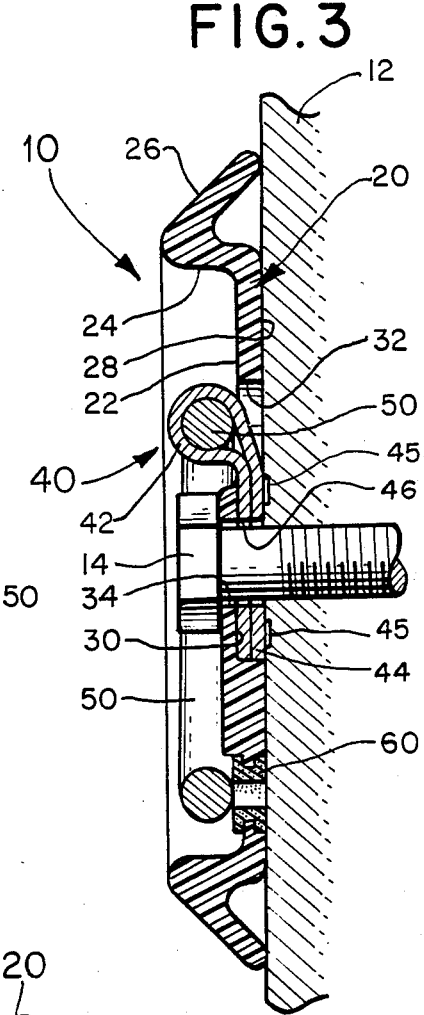
FIG. 3 is a sectional view taken along line 3—3 of FIG. 2.
Figure 1:
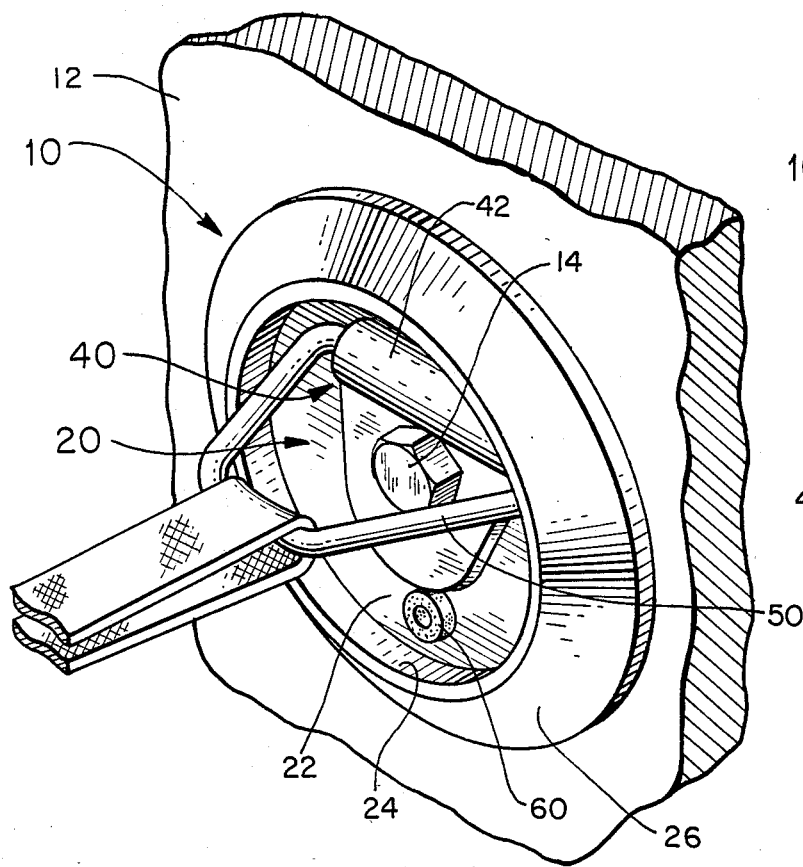
FIG. 1 is a perspective view of a first preferred embodiment of the tie-down assembly of this invention showing the tie-down ring in the use position.
Figure 2:
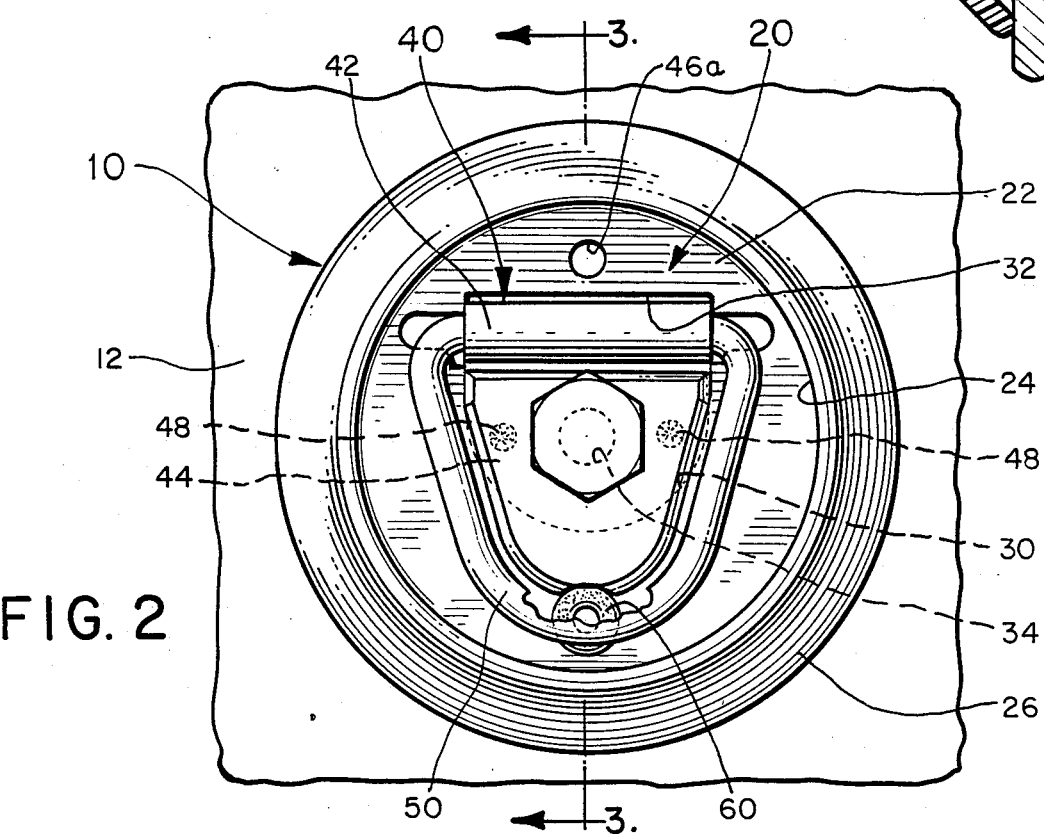
FIG. 2 is a plan view of the tie-down assembly of FIG. 1 showing the tie-down ring in the stowed position.

Turning now to the drawings, FIGS. 1-3 show various views of a first preferred embodiment of the tie-down assembly of this invention and FIGS. 3-6 show various views of a second preferred embodiment of this invention.

THE FIRST PREFERRED EMBODIMENT

As shown in FIGS. 1-3, the tie-down assembly 10 includes a guard member or cup 20 which is preferably formed in one piece of a suitable plastic material, such as a high impact copolymer polypropylene. The cup 20 defines a central circular floor 22 which is surrounded by an inner peripheral wall 24. The inner peripheral wall 24 is joined at its upper edge with an annular, beveled exterior surface 26. The floor 22, wall 24, and beveled surface 26 cooperate to define the front surface of the cup 20. The rear surface 28 of the cup 20 defines a pocket or depression 30 situated in a central portion of the rear surface 28. A slit 32 and a central opening 34 are defined in the floor 22 of the cup 20.

The tie-down assembly 10 also includes a clamp 40 which comprises a sleeve section 42 and a shank section 44. An opening 46 is defined in the shank section 44. As best shown in FIG. 3, the clamp 40 is formed of a folded piece of sheet metal, such as for example zinc-plated steel of 0.060 inches in thickness. The sleeve section 42 is generally cylindrical in shape and is formed in the region where the metallic sheet is folded over onto itself. When the tie-down assembly 10 is assembled as shown in the drawings, the sleeve section 42 is positioned entirely within a recess defined by the floor 22 and the inner peripheral wall 24. The shank section 44 passes through the slit 32 and is disposed entirely within the pocket or depression 30. When assembled, the opening 46 in the clamp 40 is aligned with the opening 34 in the floor 22. Preferably, the two layers of sheet metal in the shank section 44 are secured together by means of spot welds 48, as shown in FIG. 2.

A tie-down ring 50 is pivotably mounted within the sleeve section 42 such that it can be pivoted about the axis shown in FIG. 3. In this preferred embodiment, the tie-down ring 50 is formed of ¼-inch diameter zinc-plated steel. A resilient spacer 60, such as a rubber grommet, is secured to the floor 22 so as to hold the tie-down ring 50 above the floor 22 to reduce noise.

In FIGS. 2 and 3, the tie-down ring 50 is shown in a stowed position in which it rests entirely within the recess defined by the inner peripheral wall 24 and the floor 22. When the tie-down ring 50 is in the stowed position, no part of the tie-down ring 50 or the clamp 40 extends above the inner peripheral wall 24.

Simply by way of example, and without in any way limiting the scope of this invention, in this preferred embodiment the diameter of the floor 22 is 3 inches and the outer diameter of the beveled surface 26 is 4 and 7/64ths inches. The height of the beveled surface 26 as measured from the rear surface 28 is ½ inch.

As best shown in FIG. 3, the tie-down assembly 10 is secured in place to a mounting surface 12 by means of a bolt 14. This bolt 14 passes through the openings 34 and 46 in order simultaneously to secure the cup 20 and the clamp 40 to the mounting surface 12. Because the clamp 40 is formed as a one-piece sheet of metal, and both ends of this sheet are firmly secured to the mounting surface 12 by the bolt 14, the overall strength of the tie-down assembly 10 is not limited by the strength of the individual spot welds. For this reason, a particularly high pull-out resistance is provided even though only a single fastener is used to secure the tie-down assembly 10 in place. The rear of the shank section 44 defines several protrusions 45 which in this preferred embodiment have a height of about 0.015 inches. These protrusion 45 bite into the mounting surface 12 to impede rotation of the tie-down assembly 10 when only a single fastener 14 is used to secure the tie-down assembly 10 in place. An additional opening 46a can be provided in the floor 22 if desired to allow an additional fastener to be used to secure the tie-down assembly in place. A particular advantage of such an additional fastener is that it clearly defines the angular orientation of the tie-down assembly 10 and prevents it from rotating in place.

Furthermore, since tie-down loads are transferred directly by the clamp 40 and the fastener 14 to the mounting surface 12, the cup 20 can be manufactured as a single piece, and a plastic material can be used to define the floor 22. For this reason, only three pieces, the cup 20, the clamp 40, and the tie-down ring 50, are required for the tie-down assembly 10. This assembly 10 is easily mounted in place to the mounting surface 12 without requiring any recessing of the tie-down assembly 10 into the surface 12. Furthermore, no part of the tie-down assembly 10 extends above the beveled surface 26, and thus damage to cargo is minimized.

THE SECOND PREFERRED EMBODIMENT

Figure 4:
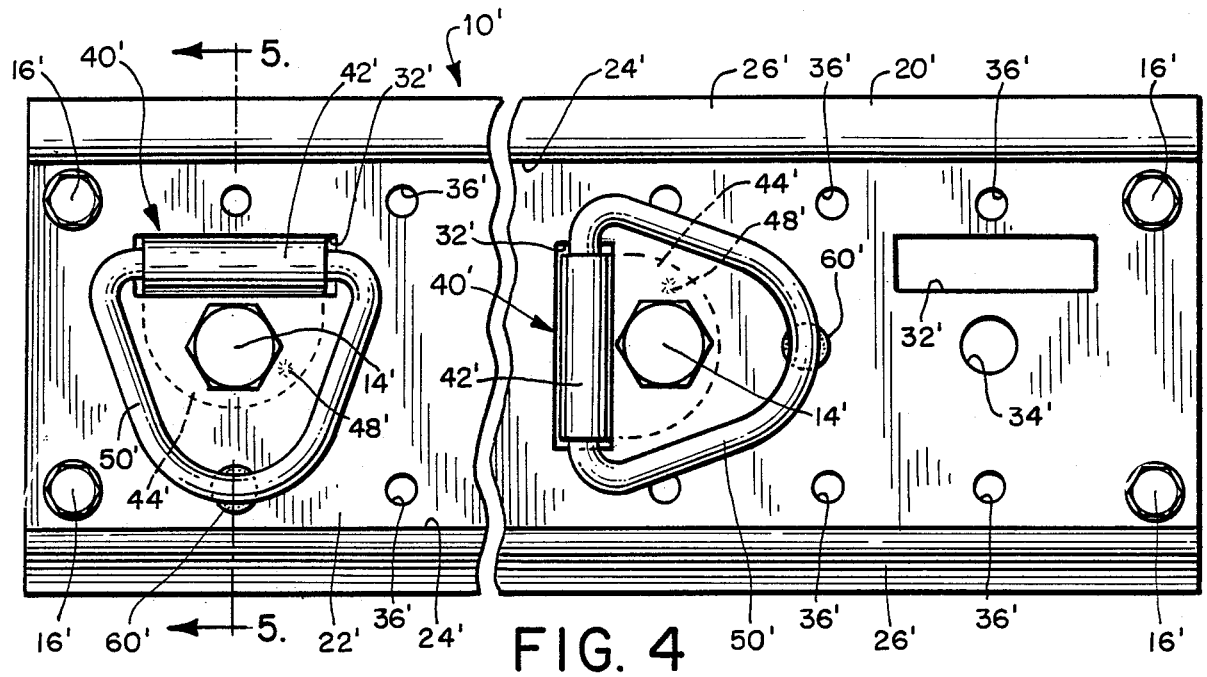
FIG. 4 is a front view of a second preferred embodiment showing two tie-down rings in the stowed position.
Figure 5:
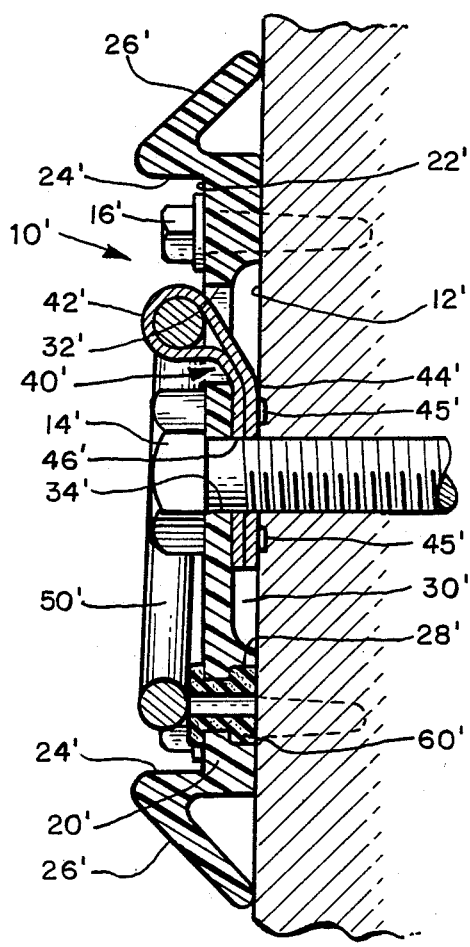
FIG. 5 is a cross-sectional view taken along 5—5 of FIG. 4.
Figure 6:
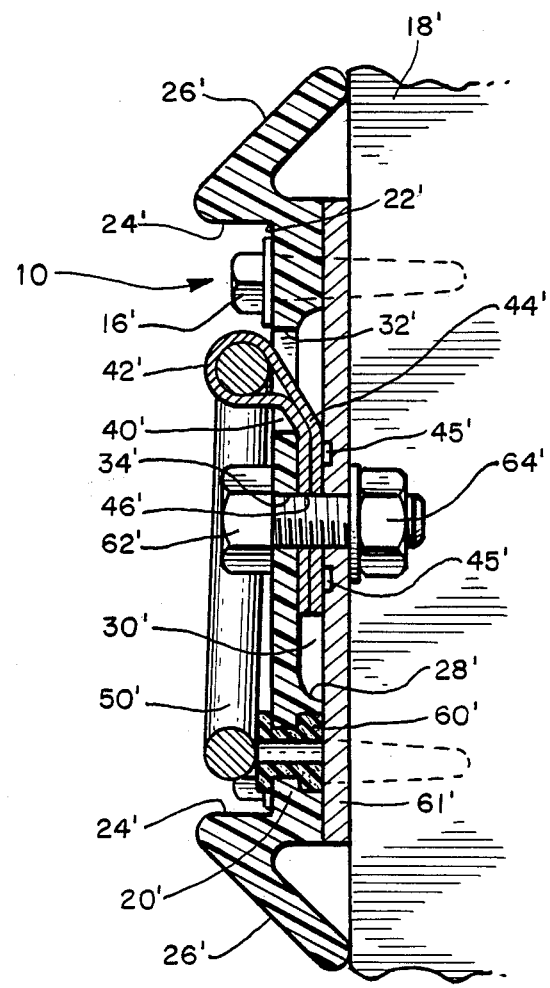
FIG. 6 is a cross-sectional view of the embodiment of FIGS. 4 and 5 mounted to a support plate.

FIGS. 4–6 show various views of a second preferred embodiment which is in many ways similar to the first embodiment of FIGS. 1–3. Corresponding elements of the two embodiments are identified by the same reference numeral, except that a prime symbol is added for elements of the second embodiment.

In FIGS. 4–6, the reference numeral 10' is used to identify the second preferred embodiment of the tie-down assembly of this invention. This tie-down assembly 10' includes a guard member or guard rail 20' which is preferably formed in one piece of a suitable plastic material, such as a high impact copolymer polypropylene. The guard rail 20' defines a central floor 22' which is bounded on two opposed sides by spaced, parallel inner peripheral walls 24'. The inner peripheral walls 24' are joined at their upper edges with respective beveled exterior surfaces 26'. The floor 22', walls 24', and beveled surfaces 26' cooperate to define the front surface of the guard rail 20'. The rear surface 28' of the guard rail 20' defines a pocket or depression 30' situated in a central portion of the rear surface 28'. As best shown in FIG. 4, the floor 22' defines an array of slits 32', each of which is positioned adjacent to a respective central opening 34'. In the illustrated embodiment of FIG. 4, the slits 32' alternate in orientation such that half of the slits 32' are oriented parallel to the peripheral walls 24', and the other half of the slits 32' are oriented perpendicular to the peripheral walls 24'. The floor 22' also defines two linear arrays of lateral openings 36'.

The tie-down assembly 10' also includes a plurality of clamps 40', each of which comprises a sleeve section 42' and a shank section 44'. An opening 46'0 is defined in the shank section 44'. Each of the clamps 40' is formed of the same materials and with the same dimensions as the clamp 40 described above. When the tie-down assembly 10' is assembled as shown in the drawings, each of the sleeve sections 42' is positioned entirely within a recess defined by the floor 22' and the inner peripheral walls 24'. The shank section 44' of each of the clamps 40' passes through a respective one of the slits 32' and is disposed entirely within the pocket or depression 30'. When so assembled, the openings 46' in the clamps 40' are aligned with the respective openings 34' in the floor 22'. Preferably, the two layers of sheet metal in each of the shank sections 44' are secured together by means of a spot weld 48', as shown in FIG. 4.

A tie-down member 50' is pivotably mounted within the sleeve section 42' of each of the clamps 40' such that the tie-down members 50' can be pivoted about the axis shown in FIG. 5. In this preferred embodiment, each of the tie-down members 50' is formed of ¼ inch diameter zinc plated steel. Preferably, a low carbon alloy, such as C-1010 or C-1008, may be used. A resilient spacer 60', such as a rubber grommet, is secured to the floor 22' so as to hold the tie-down members 50' above the floor 22' to reduce noise.

In FIG. 5, one of the tie-down members 50' is shown in a stowed position in which it is entirely within the recess defined by the inner peripheral walls 24' and the floor 22'. When the tie-down members 50' are in the stowed position, no part of the tie-down members 50' or the clamps 40' extends above the inner peripheral walls 24'.

Simply by way of example, and without in any way limiting the scope of this invention, in this preferred embodiment the width of the floor 22' between the inner peripheral walls 24' is 3 inches, and the extreme width of the guard rail 20' is 4 7/64ths inches. The height of the beveled surface 26' as measured from the rear surface 28' is ½ inch.

As best shown in FIG. 5, the tie-down assembly 10' may be secured in place to a mounting surface 12' by means of a number of bolts 14'. Each of these bolts 14' passes through the openings 34' and 46' in order simultaneously to secure the guard rail 20' and one of the clamps 40' to the mounting surface 12'. Several protrusions 45' similar to those described above are positioned to bite into the mounting surface 12' to impede rotation of the clamps 40'.

In many applications, it will be advisable to use a number of additional fasteners 16' to secure the guard rail 20' in place to the mounting surface 12'. These additional fasteners 16' pass through the lateral openings 36' and serve to maintain the beveled surfaces 26' in place against the mounting surface 12'. The clamps 40' are each formed as a one-piece sheet of metal as described above in connection with the first preferred embodiment, and they therefore provide the strength advantages described above.

In some applications, it may be desirable to mount the tie-down assembly 10' to a support plate 61'. This can be accomplished by means of a number of bolts 62' and nuts 64' as shown in FIG. 6. The support plate 61' can be formed of any material of suitable strength, and aluminum or steel plates are satisfactory for many applications. When so mounted, the tie-down assembly 10' mounted on the support plate 61' can then be secured in place, as for example to an array of parallel mounting studs 18'. A particular advantage of this mounting arrangement is that the clamps 40' can be positioned between the mounting studs 18', in positions where there is no suitable anchor for a bolt such as the bolt 14' shown in FIG. 5.

Another advantage of the embodiments of FIGS. 4–6 is that the clamps 40' and associated tie-down members 50' can be positioned in any desired ones of the slits 32'. Thus, a single guard rail 20' can accommodate a wide range of differing mounting patterns for the clamps 40'. Clamps 40' can be mounted in and removed from desired ones of the slits 32' after the guard rail 20' has been mounted in place.

The guard rail 20' can be formed of a wide variety of materials. Preferably, the guard rail 20' is wear-resistant and formed of a high impact material such that it functions as a rub rail to protect adjacent items from contact with the clamps 40'. In addition to the polypropylene material described above, other plastics, hard rubber, or aluminum are suitable for at least some applications of this invention. A particular advantage in using a flexible plastic material for the guard rail 20' is that long lengths of the guard rail 20' can be wound up on a spool and then unwound and cut to length when needed.

It should clearly be understood that a wide variety of changes and modifications can be made to the preferred embodiments described above. For example, the particular shape of the guard rail 20' can be modified to suit individual applications, both as to width and shape. Furthermore, a wide variety of tie-down members can be substituted for the D-ring shown in the drawings. For example, square rings may be suitable for applications in which straps are used and a variety of closed and open hooks are suitable for use in securing lines. For this reason, the term "tie-down member" is intended in its broad sense to encompass the entire range of suitable shapes.

In some applications, it may be preferable to include beveled end caps at the ends of the guard rail 20' in order to encircle the clamps 40' completely with raised inner peripheral walls 24'. Another alternative suitable for some applications is the inclusion of a spring in order to spring bias each of the tie-down members 50' to the stowed position shown in FIGS. 4–6.

The preferred embodiment shown in FIGS. 4–6 is suitable for a wide variety of applications. It can be used, for example, within the cargo compartment of a truck in order to tie down freight. In addition, the tie-down assembly 10' can be used to secure luggage to a recreational vehicle, or to secure tools in place inside a garage. When the metal components 40', 50' are made of a suitable material such as stainless steel, the tie-down assembly 10' can be used in marine applications. In all of these applications, the important features of this invention in terms of simplicity and economy of construction, ease of mounting, and high pull-out resistance are significant advantages.

Of course, it should be understood that a wide range of changes and modifications to the preferred embodiments described above will be apparent to those skilled in the art. For example, the tie-down ring 50 may be embodied as a C-shaped element rather than a closed loop. Furthermore, the present invention can be embodied in tie-down assemblies of any desired dimensions, proportions, or materials, in accordance with the desired application. It is therefore intended that the foregoing detailed description be regarded as illustrative rather than limiting, and that it be understood that it is the following claims, including all equivalents, which are intended to define the scope of this invention.

I claim:

1. A tie-down assembly comprising:
    a guard member which defines a central floor and an interior wall which cooperate to define a recess, a beveled exterior surface located outwardly from the interior wall, and a first opening in the floor;
    a clamp which defines a sleeve section disposed in the recess, and a shank section which passes through the first opening in the floor;
    a tie-down member pivotably mounted in the sleeve section and movable between a stowed position, in which no part of the clamp or tie-down member extends out of the recess, and a use position; and
    means for defining aligned openings in the floor and the shank section, said aligned openings adapted to receive a fastener for securing the tie-down assembly to a mounting surface.

2. The invention of claim 1 wherein the guard member further defines a pocket on a back side of the guard member, said pocket sized to receive the portion of the shank section of the clamp which passes through the first opening in the floor.

3. The invention of claim 1 further comprising a resilient spacer mounted to the floor to support the tie-down member above the floor when the tie-down member is in a stowed position.

4. The invention of claim 1 wherein the guard member is formed of a plastic material and the clamp and the tie-down member are formed of a steel.

5. The invention of claim 1 wherein the floor is elongated in shape, and wherein the interior wall is rectilinear in shape.

6. A tie-down assembly for mounting on a surface, said assembly comprising:
   a guard rail which defines a rear surface and a front surface;
   said front surface comprising a central floor, a pair of spaced, parallel interior walls on either side of the floor, and a pair of beveled surfaces located outwardly of the interior walls, said interior walls and floor cooperating to define a recess;
   said rear surface defining a central depression;
   means for defining a slit in the floor;
   means for defining a first central opening in the floor;
   a clamp formed of a folded metallic sheet, said clamp comprising a sleeve section and a shank section, said shank section defining a second central opening and sized to fit within the central depression, said clamp disposed with the sleeve section in the recess such that no part of the sleeve section extends out of the recess and the shank section passes through the slit and lies in the depression with the second central opening of the shank section aligned with the first central opening of the floor;
   a tie-down member pivotably mounted in the sleeve section of the clamp to move between a stowed position, in which no part of the tie-down member extends out of the recess, and a use position.

7. The invention of claim 6 further comprising a resilient spacer mounted to the floor to support the tie-down member above the floor when the tie-down member is in the stowed position.

8. The invention of claim 6 wherein the shank section lies completely in the depression and does not extend past the rear surface.

9. The invention of claim 6 wherein the folded metallic sheet is spot-welded together in the shank section.

10. The invention of claim 6 further comprising a support plate positioned adjacent to the rear surface of the guard rail, and a fastener which extends through the first and second central openings to secure the clamp and the guard rail to the support plate.

11. A tie-down assembly comprising:
   a guard rail which defines a rear surface and a front surface;
   said front surface comprising a central floor, a pair of spaced, parallel interior walls on either side of the floor, and a pair of beveled surfaces located outwardly of the interior walls, said interior walls and floor cooperating to define a recess;
   said rear surface defining a central depression;
   means for defining an array of slits in the floor;
   means for defining an array of central openings in the floor, each adjacent to a respective one of the slits;
   a plurality of clamps, each formed of a respective folded metal sheet, each clamp comprising a sleeve section and a shank section, each shank section defining a respective mounting opening and sized to fit within the central depression, each of said clamps disposed with the respective sleeve section in the recess and with the respective shank section passing through one of the slits and lying in the depression with the mounting opening aligned with the respective central opening of the floor; and
   a plurality of tie-down members, each pivotably mounted in the sleeve section of a respective one of the clamps to move between a stowed position and a use position.

12. The invention of claim 11 further comprising a plurality of resilient spacers, each mounted to the floor to support a respective one of the tie-down members above the floor.

13. The invention of claim 11 further comprising a support plate positioned adjacent to the rear surface of the guard rail, and a plurality of fasteners, each of which extends through one of the central openings of the floor and the mounting opening of the respective one of the clamps to secure the clamps and the guard rail to the support plate.

14. A tie-down assembly comprising:
   a cup which defines a central floor and an interior wall which cooperate to define a recess, a beveled exterior surface which surrounds the interior wall, and a first opening in the floor;
   a clamp which defines a sleeve section disposed in the recess, and a shank section which passes through the first opening in the floor;
   a tie-down member pivotably mounted in the sleeve section and movable between a stowed position, in which no part of the clamp or tie-down member extends out of the recess, and a use position; and
   means for defining aligned openings in the floor and the shank section, said aligned openings adapted to receive a fastener for securing the tie-down assembly to a mounting surface;
   said cup further defining a pocket on a back side of the cup, said pocket sized to receive the portion of the shank section of the clamp which passes through the first opening in the floor.

15. The invention of claim 14 further comprising a resilient spacer mounted to the floor to support the tie-down member above the floor when the tie-down member is in the stowed position.

16. The invention of claim 14 wherein the cup is formed of a plastic material and the clamp and the tie-down member are formed of a steel.

17. The invention of claim 14 wherein the floor is circular in shape and the aligned opening in the floor is centered in the floor.

18. A tie-down assembly for mounting on a surface, said assembly comprising:
   a cup which defines a rear surface and a front surface;
   said front surface comprising a central floor, an interior wall surrounding the floor, and an annular beveled surface surrounding the interior wall, said interior wall and floor cooperating to define a recess;
   said rear surface defining a central depression;
   means for defining a slit in the floor;
   means for defining a first central opening in the floor;
   a clamp formed of a folded metallic sheet, said clamp comprising a sleeve section and a shank section, said shank section defining a second central opening and sized to fit within the central depression, said clamp disposed with the sleeve section in the recess such that no part of the sleeve section extends out of the recess and the shank section passes through the slit and lies in the depression with the second central opening of the shank section aligned with the first central opening of the floor;
   a tie-down ring pivotably mounted in the sleeve section of the clamp to move between a stowed position, in which no part of the ring extends out of the recess, and a use position.

19. The invention of claim 18 further comprising a resilient spacer mounted to the floor to support the ring above the floor when the ring is in the stowed position.

20. The invention of claim 18 wherein the shank section lies completely in the depression and does not extend past the rear surface.

21. The invention of claim 18 wherein the folded metallic sheet is spot-welded together in the shank section.

22. A tie-down assembly comprising:
a guard member which defines a central floor having a front and rear surface, an interior wall which cooperates with the front surface to define a recess, and a beveled exterior surface located outwardly from the interior wall, said floor defining at least one opening;
a tie-down member;
a clamp which defines first and second ends and an intermediate portion, wherein the intermediate portion is wrapped around the tie-down member to form a sleeve section, and wherein the first and second ends are positioned adjacent one another to form a shank section;
said sleeve section disposed in the recess and said shank section positioned adjacent the floor such that at least a portion of the shank section overlaps at least a portion of the floor and the shank section is exposed at least in part at the rear surface via the opening;
said tie-down member pivotable in the sleeve section and movable between a stowed position and a use position; and
means for defining aligned openings in the first and second ends of the shank section of the clamp, said aligned openings adapted to receive a fastener which passes through the shank section and the floor to simultaneously (1) secure the tie-down assembly to a mounting surface, (2) secure the first and second ends of the clamp together, and (3) clamp together the overlapping portions of the shank section and the floor.

23. The invention of claim 22 wherein the floor defines an additional opening, wherein the shank section passes through the additional opening in the floor, and wherein the guard member further defines a pocket on a back side of the guard member, said pocket sized to receive the portion of the shank section of the clamp which passes through the additional opening in the floor.

24. The invention of claim 22 wherein the guard member comprises a cup and wherein the beveled exterior surface surrounds the interior wall.

25. The invention of claim 22 wherein the guard member comprises an elongated rail and wherein the beveled exterior surface extends along two sides of the rail.

26. The invention of claim 22 wherein the shank section passes through the opening in the floor.

27. The invention of claim 1 wherein the tie-down member is pivotably mounted in the sleeve section and is movable between a stowed position, in which no part of the clamp or tie-down member extends out of the recess, and a use position.

28. The invention of claim 22 wherein the rear surface is aligned with the exposed part of the shank section.

29. The invention of claim 22 wherein the exposed part of the shank section defines a plurality of protrusions adapted to bite into the mounting surface to impede rotation of the clamp with respect to the mounting surface.

30. The invention of claim 22 wherein the clamp provides a continuous, uninterrupted strip which extends from the first end, around the tie-down member, to the second end which comprises both the sleeve section and the shank section.

* * * * *